(12) United States Patent
Hoefler et al.

(10) Patent No.: US 10,443,620 B2
(45) Date of Patent: Oct. 15, 2019

(54) HEAT DISSIPATION SYSTEM FOR ELECTRIC AIRCRAFT ENGINE

(71) Applicant: General Electric Company, Schenectady, NY (US)

(72) Inventors: Florian Hoefler, Garching bei München (DE); Thomas Ripplinger, Garching bei München (DE); Jorge Benignos, Garching bei München (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/860,000

(22) Filed: Jan. 2, 2018

(65) Prior Publication Data
US 2019/0203735 A1 Jul. 4, 2019

(51) Int. Cl.
*F04D 29/58* (2006.01)
*F01D 9/06* (2006.01)
(Continued)

(52) U.S. Cl.
CPC ......... *F04D 29/5806* (2013.01); *F01D 9/065* (2013.01); *F02C 7/141* (2013.01);
(Continued)

(58) Field of Classification Search
CPC ...... F04D 29/542; F04D 29/584; F01D 9/041; F01D 25/12; F01D 9/065; F01D 25/08; F02C 7/185
See application file for complete search history.

(56) References Cited

U.S. PATENT DOCUMENTS

| 4,136,516 A | 1/1979 | Corsmeier |
| 4,914,904 A | 4/1990 | Parnes et al. |

(Continued)

FOREIGN PATENT DOCUMENTS

| EP | 2413483 A1 | 2/2012 |
| EP | 3023724 A1 | 5/2016 |
| EP | 3168425 A1 | 5/2017 |

OTHER PUBLICATIONS

European Search Report and Written Opinion dated Apr. 5, 2019 which was issusued in connection with EP 18212586.4 which was filed on Dec. 14, 2018.

*Primary Examiner* — Nathaniel E Wiehe
*Assistant Examiner* — Latoia L Sudler
(74) *Attorney, Agent, or Firm* — Buckley, Maschoff & Talwalkar, LLC

(57) ABSTRACT

The example embodiments are directed to a heat dissipation system for an electric aircraft engine. In an example, the aircraft engine includes an electric system configured to power an engine fan to provide thrust to an aircraft, the electric system including cooling channels to receive a coolant to cool one or more components of the electric system, a power source to power the electric system, and one or more guide vanes connected to the cooling channels of the electric system and configured to receive the coolant heated by and output from the cooling channels, wherein the one or more guide vanes are further to cool the heated coolant and transfer the cooled coolant back to the cooling channels of the electric system. By dissipating heat from electric system via the guide vanes, the cooling system can provide sufficient cooling without adding additional drag to the aircraft.

20 Claims, 4 Drawing Sheets

(51) Int. Cl.
*F02C 7/141* (2006.01)
*F02K 3/06* (2006.01)
*F04D 19/00* (2006.01)
*F04D 29/56* (2006.01)
*F28D 21/00* (2006.01)

(52) U.S. Cl.
CPC .............. *F02K 3/06* (2013.01); *F04D 19/002* (2013.01); *F04D 29/56* (2013.01); F05D 2220/323 (2013.01); F05D 2220/36 (2013.01); F05D 2240/12 (2013.01); F05D 2260/213 (2013.01); F05D 2260/22141 (2013.01); F28D 2021/0021 (2013.01); F28D 2021/0089 (2013.01)

(56) References Cited

U.S. PATENT DOCUMENTS

| | | | |
|---|---|---|---|
| 5,203,163 A | 4/1993 | Parsons | |
| 5,205,115 A | 4/1993 | Plemmons et al. | |
| 6,506,021 B1 * | 1/2003 | Wilson | F01D 5/08 415/115 |
| 6,619,916 B1 * | 9/2003 | Capozzi | F01D 5/148 415/160 |
| 7,125,222 B2 * | 10/2006 | Cormier | F01D 17/162 415/160 |
| 7,377,098 B2 | 5/2008 | Walker et al. | |
| 7,900,437 B2 | 3/2011 | Venkataramani et al. | |
| 7,900,438 B2 | 3/2011 | Venkataramani et al. | |
| 7,908,840 B2 | 3/2011 | Schwarz et al. | |
| 8,424,285 B2 * | 4/2013 | Veilleux, Jr. | F01D 25/12 60/39.83 |
| 8,616,834 B2 | 12/2013 | Knight, III et al. | |
| 8,915,703 B2 * | 12/2014 | Mohammed | F04D 29/563 415/160 |
| 9,909,448 B2 * | 3/2018 | Gerstler | F01D 9/041 |
| 10,053,222 B2 * | 8/2018 | Snyder | B64D 13/06 |
| 10,087,775 B2 * | 10/2018 | Mulcaire | F01D 25/12 |
| 10,196,932 B2 * | 2/2019 | Sennoun | F01D 25/125 |
| 2008/0056888 A1 * | 3/2008 | Somanath | F01D 5/147 415/142 |
| 2011/0110801 A1 * | 5/2011 | Chiu | F04D 13/0646 417/366 |
| 2013/0011246 A1 | 1/2013 | Todorovic | |
| 2014/0209286 A1 | 7/2014 | Freund et al. | |
| 2014/0290272 A1 * | 10/2014 | Mulcaire | F01D 25/12 60/806 |
| 2014/0352315 A1 * | 12/2014 | Diaz | B64D 33/10 60/772 |
| 2015/0232191 A1 | 8/2015 | Wetzel | |
| 2016/0146219 A1 * | 5/2016 | Lyon | F04D 13/0606 417/53 |
| 2016/0167800 A1 * | 6/2016 | Joubert | H01M 10/625 429/62 |
| 2016/0215696 A1 * | 7/2016 | Snyder | F02C 7/16 |
| 2016/0305279 A1 * | 10/2016 | Gerstler | F01D 9/041 |
| 2017/0002685 A1 * | 1/2017 | Todorovic | F01D 9/02 |
| 2017/0050740 A9 * | 2/2017 | Snyder | B64D 13/06 |
| 2017/0159489 A1 | 6/2017 | Sennoun | |
| 2017/0204879 A1 * | 7/2017 | Zaccardi | F01D 9/065 |
| 2017/0292531 A1 * | 10/2017 | Snyder | F04D 29/542 |
| 2017/0298822 A1 * | 10/2017 | Garde La Casa | F02C 9/18 |
| 2018/0156120 A1 * | 6/2018 | Menheere | F02C 7/14 |
| 2018/0171810 A1 * | 6/2018 | Jung | F01D 25/162 |
| 2018/0298769 A1 * | 10/2018 | Jeong | F01D 9/065 |
| 2019/0003315 A1 * | 1/2019 | Erno | F01D 5/187 |
| 2019/0014687 A1 * | 1/2019 | Snyder | H05K 7/20336 |

* cited by examiner

HEAT DISSIPATION SYSTEM FOR ELECTRIC AIRCRAFT ENGINE

BACKGROUND

Many aircraft are primarily powered by gas turbine engines that require carbon-based fuels such as gasoline or kerosene. These fuels typically contain significant energy for their weight, thereby providing the vast amount of power that is required to lift large commercial airliners on flights of thousands of miles. But with oil resources declining and penalties on greenhouse gas emissions increasing, the future of aviation is dependent on finding alternative power sources. Electric aircraft engines have recently begun being developed in an attempt to replace traditional gas turbine aircraft engines. Electric aircraft engines can rely on battery and other sources of electric power rather than carbon-based fuels thereby significantly reducing harmful emissions in comparison with gas turbine engines.

However, an electric aircraft engine struggles to generate as much thrust as a gas turbine engine. One cause in the reduced amount of thrust is that electric aircraft engines have a fan that is powered by an electrical system while gas turbine aircraft engines have a fan that is driven by a gas turbine which relies on combustion. An electric aircraft engine usually requires additional components such as a battery, generator, etc., which can cause the electric aircraft engine to be heavier than a gas turbine engine. As a result, an electric aircraft engine is less energy dense than a gas turbine engine as a result of the additional weight. Therefore, replacing gas turbine engines on a commercial aircraft with electric aircraft engines is a proposal that faces significant energy-based limitations. In an effort to address these obstacles, it is necessary to improve the overall energy efficiency of the electric aircraft.

Attempts to improve electric aircraft energy consumption include reducing weight of the aircraft and improving aerodynamics thereby generating less drag and optimizing a flight profile. However, electric aircraft engines require a very high-power density design that can overheat and must be cooled quickly or risk overheating. Adding a cooling system to an electric aircraft engine typically adds size, weight, surface area, and/or the like. As a result, a traditional cooling system can reduce the overall energy efficiency of the electric aircraft engine by generating drag. Gas turbines route oil through a conventional heat exchanger which is often a bulky object or fins within the fan stream which then reject the heat off the system. However, these items create an additional drag on the aircraft. This is not an option for an electric aircraft engine which requires improved energy efficiency.

SUMMARY

The example embodiments improve upon the prior art by providing a heat dissipation system for use with an electric aircraft engine which can be implemented within an existing structure of the electric aircraft engine. The heat dissipation system routes cooling fluid heated by an electric aircraft engine into guide vanes (e.g., outlet guide vanes, inlet guide vanes, etc.) which can dissipate heat from the heated cooling fluid thereby cooling the fluid. The guide vanes can feed the fluid back into the electric aircraft engine where it may be used to perform cooling again. Because the heat dissipation system uses already existing components of the electric aircraft engine to dissipate heat, the system does not negatively impact the drag of the aircraft because the cooling system does not add weight, size, surface area, or the like, but rather relies on components of the electric aircraft engine which are already available. In other words, the system performs a heat exchange process using components which are already integrated within the electric aircraft engine. Accordingly, the system adds the benefit of removing heat from the heated electric aircraft engine without reducing the overall energy efficiency of the flight of the aircraft.

According to an aspect of an example embodiment, provided is an electric aircraft engine which may include an electric system (e.g., electric motor, generator, battery, cables, etc.) configured to power an engine fan to provide thrust to an aircraft, wherein the electric system includes cooling channels configured to receive a coolant to absorb heat from one or more components of the electric system, a power source configured to power the electric system, and one or more guide vanes connected to the cooling channels of the electric system and configured to receive the coolant heated by and output from the cooling channels, wherein the one or more guide vanes are further configured to dissipate heat from the heated coolant to the fan flow and transfer the cooled coolant back to the cooling channels of the electric system.

According to an aspect of another example embodiment, provided is an electric aircraft engine which may include an electric system configured to power the electric aircraft engine and including cooling channels configured to receive a coolant, a pump configured to pump the coolant through the cooling channels to absorb heat from one or more components of the electric system, and one or more guide vanes connected to the cooling channels of the electric system and configured to receive the coolant heated by and output from the cooling channels, wherein the one or more guide vanes are further configured to absorb heat from the heated coolant and transfer the cooled coolant back to the cooling channels of the electric system.

According to an aspect of an example embodiment, provided is a method for dissipating heat from an electric aircraft engine via one or more guide vanes, the method including powering, via an electric system, an engine fan to provide thrust to an aircraft, pumping coolant through cooling channels of the electric system to absorb heat from one or more components of the electric system heated by the powering, pumping the coolant heated by and output from the cooling channels of the electric system into the one or more guide vanes which are connected to the cooling channels of the electric system and which dissipate heat from the heated coolant, and pumping the cooled coolant from the one or more guide vanes back into the cooling channels of the electric system.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
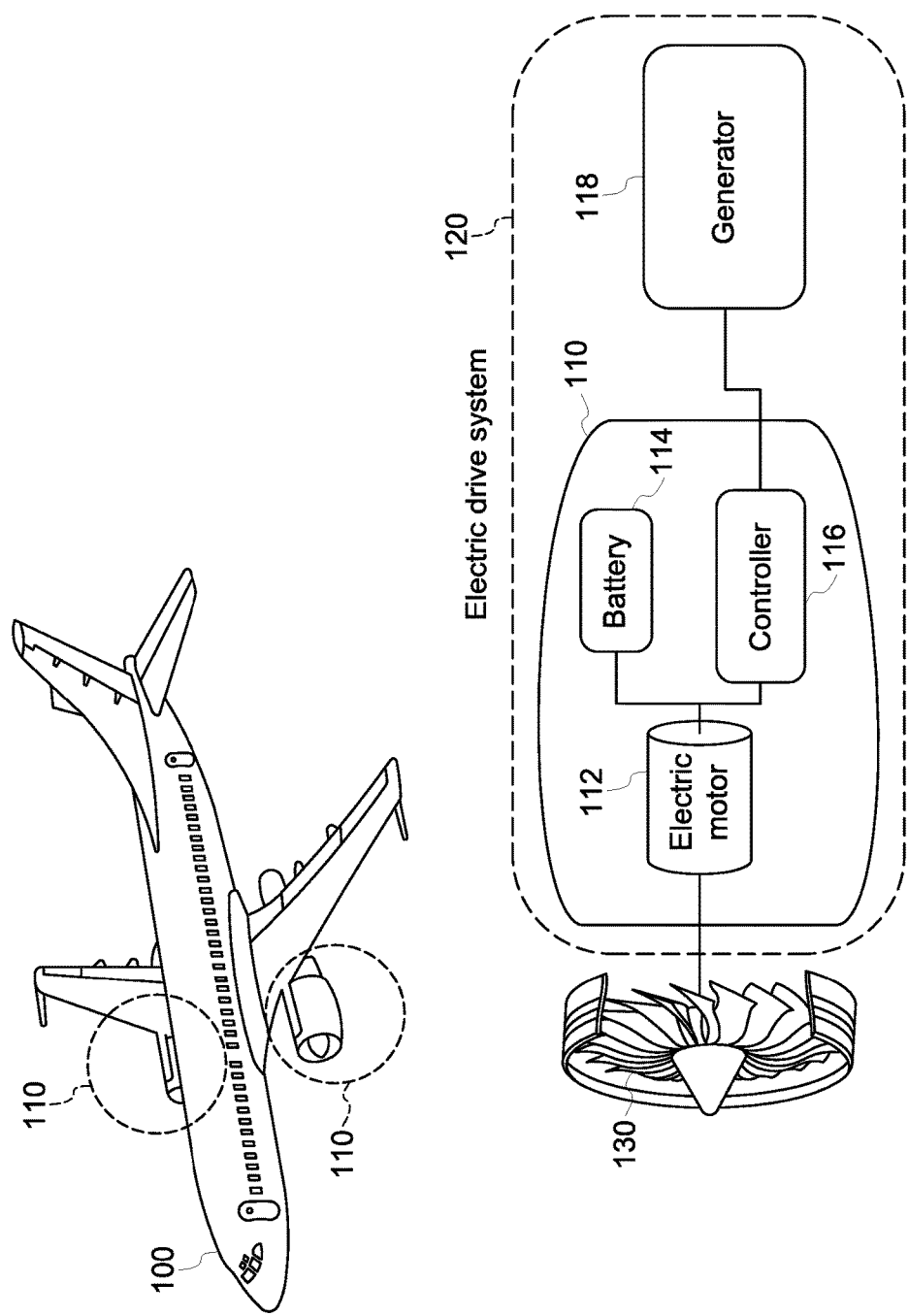
FIG. 1 is a diagram illustrating an aircraft and components of an electric aircraft engine in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Electric aircraft engines pose unique and sophisticated challenges because energy efficiency of the electric aircraft engine should be maintained and even enhanced as much as possible in order to provide enough thrust to lift an aircraft such as a commercial jet. Therefore, adding anything to an electric aircraft engine can be detrimental to the overall energy efficiency especially if the additional components add weight, surface area, drag, or anything that is going to consume more battery power during operation. Electric aircraft engines are also high energy dense machines that create a significant amount of heat that must be transferred from the electric aircraft engine into the ambient air efficiently and quickly or risk overheating the electric aircraft engine.

The example embodiments are directed to a heat dissipation system that connects to a cooling system of an electric aircraft engine. In particular, the example embodiments route heated coolant from the cooling system into guide vanes (also referred to as outlet guide vanes, inlet guide vanes, stator vanes, etc.) to dissipate heat that has been captured by engine coolant flowing in and around engine components referred to herein as an electric system. The heat dissipation system is specific for electric propulsion systems where electric energy is converted to thrust while power is generated elsewhere such as by a generator, battery, or the like. A shaft of an electric motor included in the electric aircraft engine may drive a propulsion system including a fan blade to generate thrust for the aircraft to lift the aircraft and keep the aircraft flying.

The electric system may be included within a drive system of the electric aircraft engine which may include one or more of a battery, cables, windings, a stator, and the like. The coolant can be routed through small channels or cavities within components of the electric system of the electric aircraft engine (e.g., within rotor windings, stator, magnets, etc.) to absorb heat created by the electrical components of the electric aircraft engine. However, the heat that is absorbed must be transferred to ambient air. In order to dissipate heat, the system routes heated coolant from the electrical aircraft engine into channels or cavities included within the guide vanes of the electrical engine. While in the guide vanes, the heated coolant can be rapidly cooled due to the airstream (e.g., fan flow) flowing around an outer surface of the guide vanes.

Guide vanes may direct air into the electric aircraft engine and to direct air out from the electric aircraft engine. Guide vanes may have angles that can be manipulated to change the angle at which air flows into and out of the electric aircraft engine. An electric aircraft engine may include a large fan which is used to power the engine using an electrical power system as opposed to a gas turbine engine which uses gas combustion from a gas turbine to power a fan. That is, the power that is created by the electrical power system is less energy dense because the electrical system typically weighs more (i.e., is heavier) relying on more components to create the same amount of power. Therefore, adding any additional materials to the electrical system will penalize the system more so than in a gas turbine which can compensate for additional weight with additional fuel. This is not easily performed by an electrical system. Guide vanes may be located behind the fan (e.g., outlet guide vanes or OGV) which may be used to efficiently direct air out of the engine. In some examples, guide vanes may be located in front of the fan (e.g., inlet guide vanes or IGV) which may be used to efficiently direct air onto the electric fan. Also, the electric aircraft engine can use organic heat transfer liquids such as silicon based oils, dielectrics, direct liquid cooling, etc., for coolant. In some embodiments, the coolant may be a multi-phase in which you have a combination of gas and liquid and which uses evaporation to deposit coolant.

Although the examples herein depict an electric aircraft engine such as for use with a commercial jet including two or more electric engines, it is possible that the example embodiments may be applied to other types of machines such as an electric engine for a stationary machine (e.g., a hydrofoil), an electric engine for a vehicle other than an aircraft (e.g., automobile, locomotive, seaborne/propulsion), space, and the like. It should also be appreciated that the example embodiments may be applied to a hybrid engine which may include more than one type of power (e.g., an internal combustion engine to drive an electric generator that powers an electric motor), etc.

FIG. 1 illustrates an example of an aircraft 100 and components which may be included within or otherwise connected to an electric aircraft engine in accordance with an example embodiment. Referring to the example of FIG. 1, the aircraft 100 may be a commercial airliner, a private jet, a small unmanned plane, and the like. In the example of FIG. 1, the aircraft 100 includes a plurality of electric aircraft engines 110 which may include electric motors for powering engine fans therein. The amount and the location of the electric aircraft engines 110 is not limited to what is shown in the examples of FIG. 1. For example, an engine may be included near the tail of the aircraft. As another example, the aircraft may include more engines or less engines than what is shown in FIG. 1.

FIG. 1 also illustrates an example of an electric drive system 120 which may include various components for powering the electric aircraft engine 100. For example, the electric aircraft engine 110 may include an electric motor 112 for rotating a fan 130 which generates thrust for moving and lifting the aircraft 100. For example, the fan 130 may be housed in a shroud. The electric aircraft engine 110 also includes a battery 114 for supplying the electric motor 112 with power, and a controller 116 which controls the overall operations of the electric aircraft engine 110. The electric aircraft engine 110 also includes a generator 118 which in this example is separate from a housing that includes the components of the electric aircraft engine 110, however embodiments are not limited thereto. It should be appreciated, however, that the components of the electric aircraft engine 110 are not limited to the components shown in FIG. 1. For example, the electric aircraft engine 110 may include rotor windings, a stator, a compressor, a spindle, magnets, cables, and the like, which create heat when generating electric power.

The electric drive system 120 may include various formations such as channels, cavities, casings, conduits, and the like, which are configured to route or otherwise flow coolant in and around the components of the electric aircraft engine 110 in order to absorb heat from the components. The coolant may be a gas, a liquid, or a combination thereof referred to as multi-phase. The design of the formations of the electric drive system 120 is not limited to any specific component or any specific type of channel but rather any mechanism capable of routing coolant through the electric aircraft engine 110 and its components for cooling down the engine.

Figure 2:
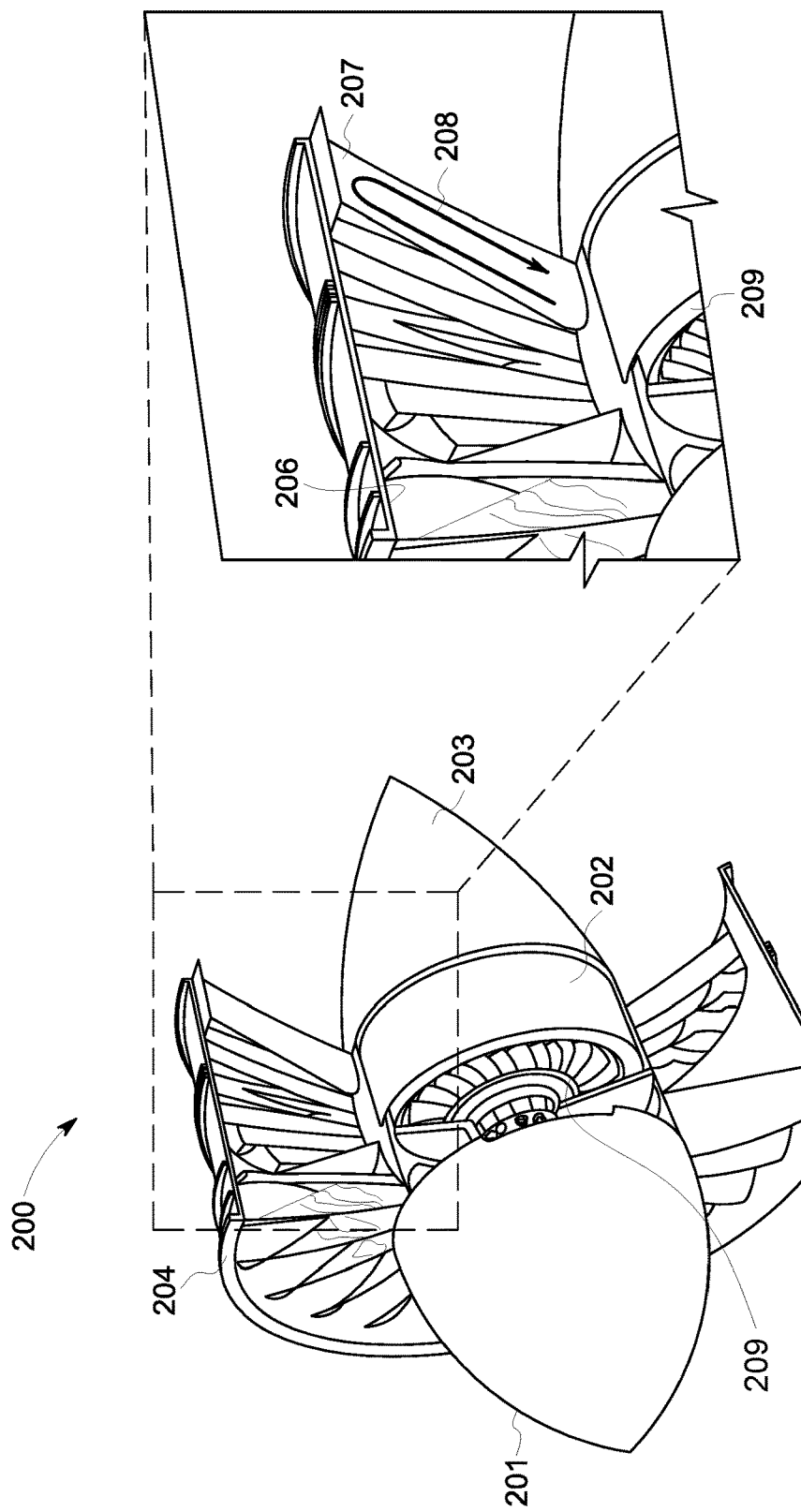
FIG. 2 is a diagram illustrating an electric aircraft engine including guide vanes in accordance with an example embodiment.

FIG. 2 illustrates an interior view of an electric aircraft engine 200 including guide vanes for dissipating heat in accordance with an example embodiment. Referring to FIG. 2, the electric aircraft engine 200 includes a nose 201, an engine area 202, a tail 203, and guide vanes 204 which are positioned in a cylindrical fashion around the outside of the engine area 202. The engine area 202 may include components of an electrical engine such as an engine fan 209, an electric motor, a battery, a generator, windings, cables, stator, magnets, and other engine components. During operation, the engine area 202 can generate significant amounts of heat when powering the fan 209 therein. Although not shown in FIG. 2, it should be appreciated that various channels, passages, cavities, or the like, may be included within and around the engine area 202 and the fan 209 through which coolant can flow and absorb heat generated by components of the engine area 202.

When cooling an engine, especially a high density electric aircraft engine 200, the heat captured by the coolant must be dissipated quickly back into the ambient air otherwise the coolant will remain above a necessary temperature to properly cool the electric aircraft engine. Related gas turbine engines burn fuel to produce power and thrust while an electric aircraft engine only generates thrust while power is supplied from an outside source. The heat dissipation system herein addresses specific issues for electric propulsion systems where electric energy is converted to thrust. More specifically, for an electric aircraft engine. The electric motor is of high power density and high energy density which in turn requires sophisticated cooling approaches to achieve adequate cooling for the motor.

The effectiveness of a cooling system is dependent upon how effective the system is in dissipating heat once heat has been absorbed by the coolant. What limits heat transfer is the design and the power density of the electric motor. Machine power density is limited by the capacity to extract heat from the heat generation sources (e.g., stators, windings, etc.) and transfer the heat back to ambient, and the pumping power needed to accomplish this. If the mechanisms being used to dump the heat back into ambient air are not adequate the engine will overheat regardless of how well the cooling system is designed.

In order to address these issues, after being heated by one or more electrical components used to power the fan 209, cooling fluid from the engine area 202 of the electric aircraft engine 200 can be routed or pumped into guide vanes 204 which are adjacent or otherwise separate from the engine area 202. Guide vanes 204 are continuously exposed to ambient air on the outer surface thereof and can provide for rapid cooling of heated liquid and gases. As shown in the magnified view on the right side of FIG. 2, the guide vanes 204 may include inlet guide vanes 206 and outlet guide vanes 207, however, designs are not limited to what is shown in FIG. 2.

Channels, passages, cavities, or the like, may be disposed within the guide vanes 206 and 207 and can be connected to cooling channels of the electric aircraft engine area 202. As another example, a casing may be added around a guide vane to provide area for coolant to flow through. According to various embodiments, cooling fluid 208 from the electric aircraft engine area 202 can be routed from the electric aircraft engine area 202 to the guide vanes (e.g. outlet guide vane 207 in FIG. 2). The guide vane can dissipate heat from the cooling fluid 208 and quickly transfer the heat into the ambient air which is continuously flowing around the guide vane 207. The speed at which the cooling function of the guide vane 207 operates can be based on various characteristics of the guide vane 207 such as surface area, material type, thickness, shape, and the like.

One of the benefits of the design in FIG. 2, is that heat from the electric aircraft engine 200 can quickly be transferred from the heated coolant (e.g., liquid/gas) back into the ambient air as it is dissipated through the guide vanes. For example, after cooling fluid has been pumped through the electric aircraft engine components and used to absorb or otherwise capture heat from the electric aircraft engine (e.g., in cavities or narrow passages around the stator, the rotor windings, magnets, bearings, motor, etc.) the heated fluid is then routed through the guide vanes (OGV and IGV) based on a pump or other pressurized mechanism. While travelling through the guide vanes the cooling liquid/gas may cool rapidly by transferring the heat to the guide vanes. Furthermore, the guide vanes can also cool rapidly while dissipating heat into the ambient air via the surface areas of the vanes. The process is expedited by the air blowing through the guide vanes as a result of the engine fan 209.

The coolant 208 may be a liquid coolant, a gas, or even multi-phase. Within the electric motor, multiphase coolant may evaporate a cooling fluid (gas and liquid phase) present in the system. The coolant may be pumped throughout the electric motor and/or components of the electrical motor. The components are sources of heat which needs to be transported away. Although not specifically shown in FIG. 2, the engine area 202 may include components such as an electric motor, a stator, rotor windings, and magnets which have current flowing therethrough to produce torque to rotate the motor. As another example, the engine area 202 may also include windings, cables, bearings, etc. that make help the fan rotate and that need to be cooled. There might be small cavities (hollow sections) in the components.

By generating a heat dissipation mechanism from already existing components of the electric aircraft engine, the heat dissipation process does not produce additional drag on the aircraft whereas other systems in the related art may add something (e.g. surface area) into a stream of air which results in additional drag on the system (more energy consumption, slower speed, etc.). In contrast, the electric aircraft engine already includes guide vanes which serve the purpose of controlling direction of airflow. That is, guide vanes have an aerodynamic purpose (structural purpose) and that intentionally contacts the engine fan airstream to recondition/condition air flowing to and from the fan to ensure the fan does not stall and to provide thrust.

Figure 3:
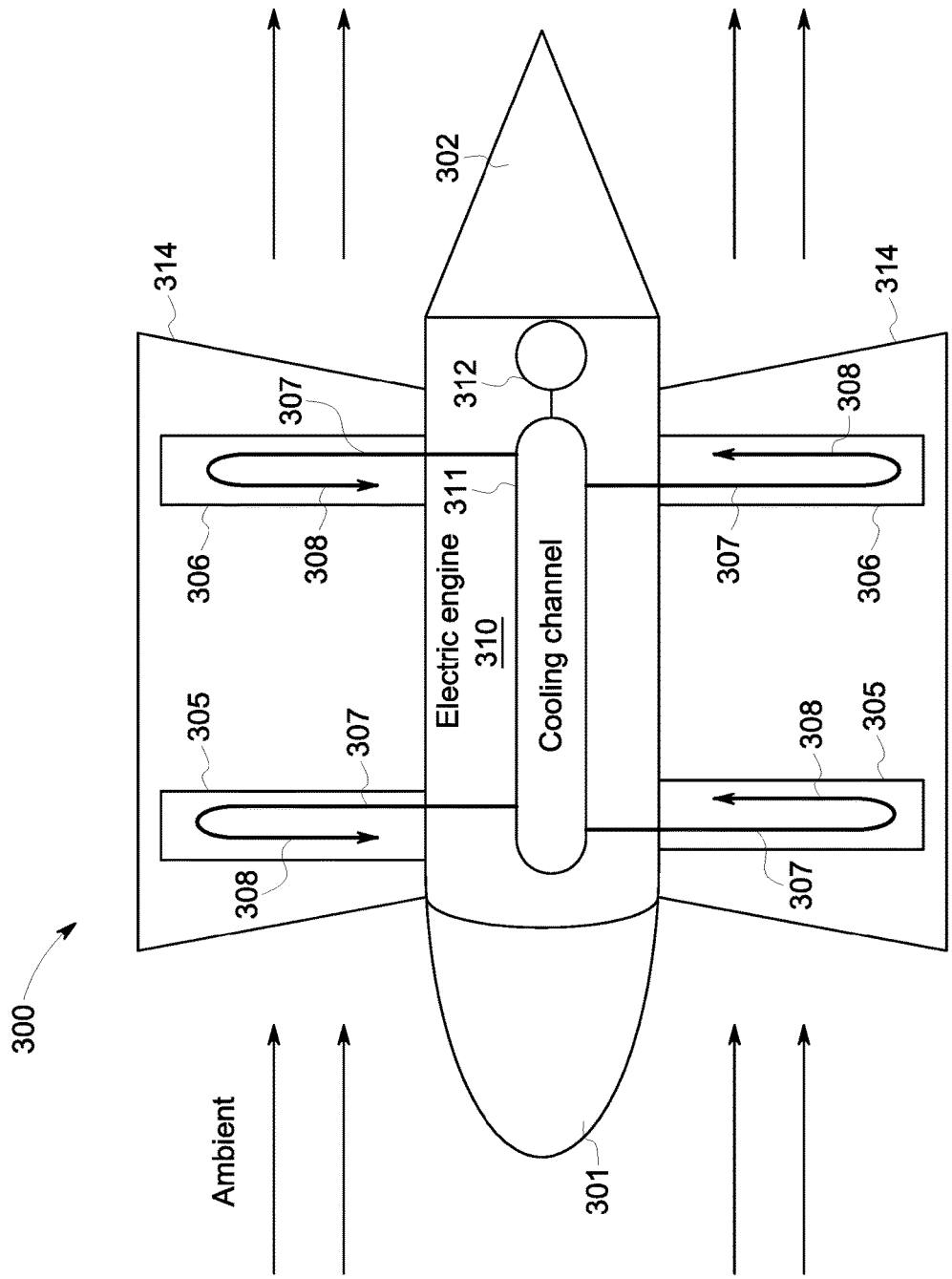
FIG. 3 is a diagram illustrating an internal view of an electric aircraft engine in accordance with example embodiments.

FIG. 3 is a diagram illustrating an internal view of an electric aircraft engine 300 in accordance with example embodiments. Referring to FIG. 3, the electric aircraft engine 300 includes a nose 301 or a head, a tail 302, and a body that includes an electric aircraft engine 310, a cooling channel 311, and a pump 312. The pump 312 may generate pressure for routing coolant through the cooling channel 311 to thereby absorb heat from various components of the electric aircraft engine 310. After absorbing the heat, the pump 312 may route heated coolant 307 into guide vanes which in this example include inlet guide vanes 305 and outlet guide vanes 306. The guide vanes may be disposed around the outside of the engine core 310 in a cylindrical structure (shown in FIG. 2), however embodiments are not limited thereto. In the example of FIG. 3, a support structure 314 is used to house the guide vanes 305 and 306. The size and shape of the support structure 314 is not limited to the example shown in FIG. 3. The guide vanes 305 and/or 306 may be formed within channels, cavities, passages, etc., of the support structure 314.

Each of the guide vanes 305 and 306 includes one or more channels 308 capable of receiving heated coolant from the electric aircraft engine 310 (e.g., via a port or output not shown) and routing the heated coolant through the structure of the guide vane. While the coolant is routed through the guide vanes 305 and 306, the coolant may dissipate heat that has been absorbed while the coolant was within the electrical engine 310. The heat may be dissipated into the ambient air which flows around the guide vanes 305 and 306. Furthermore, the coolant may be pumped back into the electric aircraft engine 310 where it can perform the function of cooling engine components again.

Figure 4:
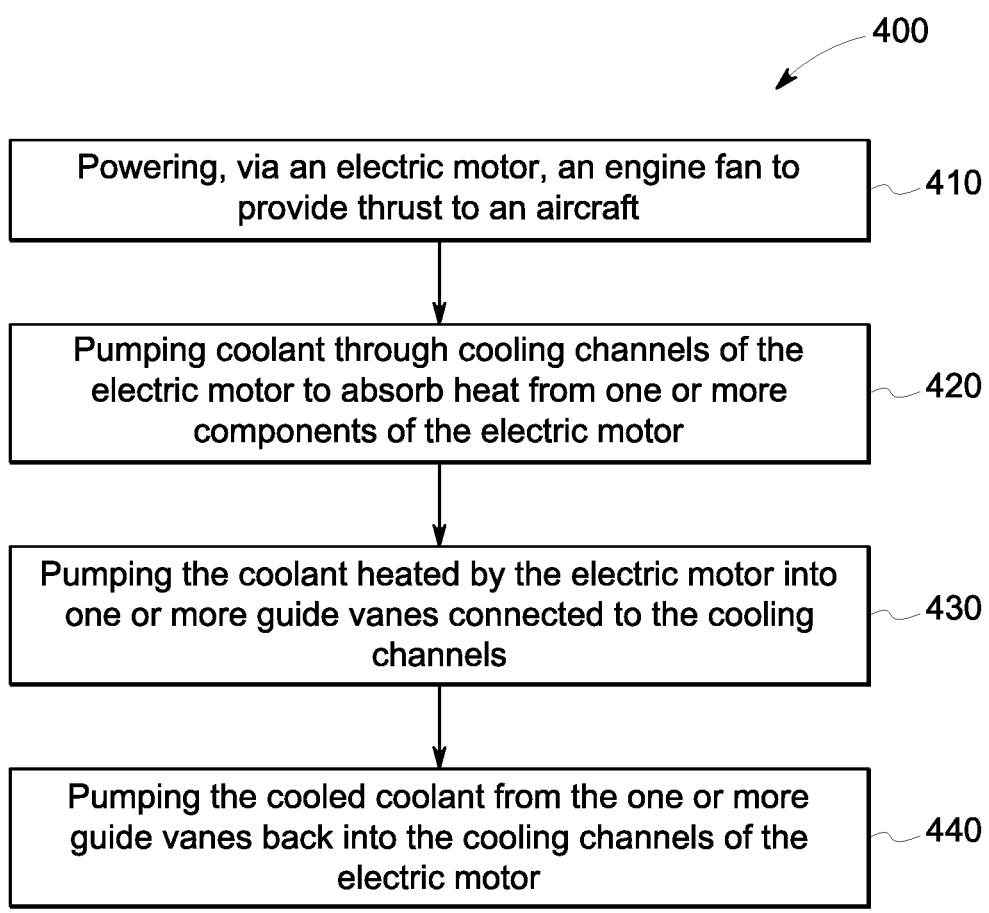
FIG. 4 is a diagram illustrating a method for dissipating heat from an electric aircraft engine in accordance with an example embodiment.

FIG. 4 illustrates a method 400 for dissipating heat from an electric aircraft engine in accordance with an example embodiment. For example, the method 400 may route coolant through an electric aircraft engine and through one or more guide vanes as shown in the examples of FIGS. 2 and 3. Referring to FIG. 4, in 410, the method includes powering, via an electric system, an engine fan to provide thrust to an aircraft. For example, the electrical system may include one or more of an electric motor, a generator, a battery, cables, and the like, which carry electricity within the motor and create heat. In 420, the method further includes pumping coolant through cooling channels of the electric motor to absorb heat from one or more components of the electric motor heated by the powering. Here, the coolant may be a liquid, a gas, or a combination thereof. Examples of coolant include organic silicon, and the like. In 430, the method includes pumping the coolant heated by and output from the cooling channels of the electric motor into the one or more guide vanes which are connected to the cooling channels of the electric motor and which dissipate heat from the heated coolant. Further, in 440 the method includes pumping the cooled coolant from the one or more guide vanes back into the cooling channels of the electric motor.

The method 400 may include pumping the heated coolant through inlet guide vanes, outlet guide vanes, casings around the guide vanes, cavities within the guide vanes, or other passages in and around the guide vanes. By pumping heated coolant out of the electric aircraft engine and into the guide vanes, rapid cooling may be performed by the method 400 of the coolant and the coolant may be fed back into the electric aircraft engine. The process may be continually repeated to continuously dissipate heat from the electric aircraft engine.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An electric aircraft engine comprising:
    an electric system configured to power an engine propulsion system to provide thrust to an aircraft, the electric system comprising cooling channels configured to receive a coolant to absorb heat from one or more components of the electric system;
    a power source configured to power the electric system; and
    one or more guide vanes connected to the cooling channels of the electric system and configured to receive the coolant heated by and output from the cooling channels, wherein the one or more guide vanes dissipate heat from the heated coolant and each guide vane comprises a cavity which receives the coolant, routes the coolant internally within the guide vane, and returns the coolant to the cooling channels via an output, while continuously keeping the coolant inside the guide vane between the input and the output of the cavity.

2. The electric aircraft engine of claim 1, wherein the electric system comprises one or more of an electric motor, a generator, a battery, and cables, and the propulsion system comprises an engine fan, and
    wherein an aircraft on which the electric aircraft engine is installed further comprises at least one gas turbine engine.

3. The electric aircraft engine of claim 1,
    wherein the one or more guide vanes comprise a plurality of guide vanes positioned in a cylindrical array and which are configured to control airflow with respect to the engine propulsion system.

4. The electric aircraft engine of claim 1, wherein the electric system and the one or more guide vanes are included within a ducted fan assembly.

5. The electric aircraft engine of claim 1, wherein the one or more guide vanes comprise a plurality of outlet guide vanes which are positioned within an airstream of the electric aircraft engine behind an engine fan.

6. The electric aircraft engine of claim 1, wherein the one or more guide vanes comprise a plurality of inlet guide vanes which are positioned within an airstream of the electric aircraft engine in front of an engine fan.

7. The electric aircraft engine of claim 1, wherein the one or more guide vanes each comprise channels for receiving the coolant from the cooling channels of the electric system.

8. The electric aircraft engine of claim 1, wherein the coolant comprises one or more of a liquid coolant, a gaseous coolant, and a multi-phase coolant.

9. The electric aircraft engine of claim 1 further comprising at least one controller for controlling at least one operation of the electric aircraft engine, wherein the power source comprises a battery, and a gas, configured to generate power.

10. The electric aircraft engine of claim 1, further comprising a pump configured to pump the coolant through the cooling channels of the electric motor into the one or more guide vanes, and through the one or more guide vanes back into the cooling channels.

11. An electric engine comprising:
an electric system configured to power an engine fan of the electric engine and comprising cooling channels configured to receive a coolant;
a pump configured to pump the coolant through the cooling channels to absorb heat from one or more components of the electric system; and
one or more guide vanes connected to the cooling channels of the electric system and configured to receive the coolant heated by and output from the cooling channels, wherein the one or more guide vanes are further configured to absorb heat from the heated coolant and each guide vane comprises a cavity which receives the coolant, routes the coolant internally within the guide vane, and returns the coolant to the cooling channels via an output, while continuously keeping the coolant inside the guide vane between the input and the output of the cavity.

12. The electric engine of claim 11, wherein the electric system comprises one or more of an electric motor and cables which are configured to power a fan within the electric engine.

13. The electric engine of claim 11, wherein the one or more guide vanes comprise a plurality of guide vanes positioned in a cylindrical array and which are configured to control airflow with respect to the engine fan of the electric engine.

14. The electric engine of claim 11, wherein the electric system and the one or more guide vanes are included within an unducted fan assembly.

15. The electric engine of claim 11, wherein the one or more guide vanes comprise a plurality of outlet guide vanes which are positioned within an airstream of the electric engine behind the engine fan of the electric engine.

16. The electric engine of claim 15, wherein the one or more guide vanes comprise a plurality of inlet guide vanes which are positioned within an airstream of the electric engine in front of the engine fan of the electric engine.

17. The electric engine of claim 16, wherein the one or more guide vanes each comprise channels for receiving the coolant from the cooling channels of the electric system.

18. The electric engine of claim 11, further comprising
at least one compressor; and
a power source configured to generate and supply power to the electric system and the pump.

19. A method for dissipating heat from an electric aircraft engine via one or more guide vanes, the method comprising:
powering, via an electric system, an engine fan to provide thrust to an aircraft;
pumping coolant through cooling channels of the electric system to absorb heat from one or more components of the electric system heated by the powering;
pumping the coolant heated by and output from the cooling channels of the electric system into the one or more guide vanes which are connected to the cooling channels of the electric system and which dissipate heat from the heated coolant, where each guide vane comprises a cavity which receives the coolant, routes the coolant internally within the guide vane, and returns the coolant to the cooling channels via an output, while continuously keeping the coolant inside the guide vane between the input and the output of the cavity; and
pumping the cooled coolant from the one or more guide vanes back into the cooling channels of the electric system wherein the coolant comprises at least one dielectric liquid.

20. The method of claim 19, wherein the one or more guide vanes comprise a plurality of guide vanes positioned in a cylindrical array which are configured to control airflow with respect to the engine fan.

\* \* \* \* \*